United States Patent
Shaik

(10) Patent No.: US 11,827,557 B1
(45) Date of Patent: *Nov. 28, 2023

(54) METHOD FOR COATING AN INTERIOR SURFACE OF A PIPE

(71) Applicant: Prince Mohammad Bin Fahd University, Dhahran (SA)

(72) Inventor: Feroz Shaik, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,356

(22) Filed: Dec. 8, 2022

Related U.S. Application Data

(63) Continuation of application No. 17/852,442, filed on Jun. 29, 2022, now Pat. No. 11,530,160.

(51) Int. Cl.
   *B01J 35/00* (2006.01)
   *B05B 5/08* (2006.01)
   (Continued)

(52) U.S. Cl.
   CPC ........... *C03C 17/004* (2013.01); *B01J 35/004* (2013.01); *B01J 37/0215* (2013.01);
   (Continued)

(58) Field of Classification Search
   CPC ... B05B 16/20; B05B 13/0627; C03C 17/004; B05C 7/00; B05C 7/02; B05C 7/06; B05C 7/08; B28B 19/0023; Y10S 118/10
   See application file for complete search history.

(56) References Cited

U.S. PATENT DOCUMENTS

| 4,252,763 A | 2/1981 | Padgett |
| 2006/0216193 A1 | 9/2006 | Johnson et al. |

(Continued)

FOREIGN PATENT DOCUMENTS

| CN | 104163537 A | 1/2014 |
| CN | 107816211 A * | 3/2018 ............. B01F 11/00 |

(Continued)

OTHER PUBLICATIONS

ARANGo, et al. ; Robotic Deposition of TiO2 Films on Flexible Substrates from Hybrid Inks: Investigation of Synthesis-Processing-Microstructure-Photocatalytic Relationships ; ACS Appl. Mater. Interfaces, 8, 37 ; pp. 24659-24670 ; Aug. 29, 2016 ; Abstract Only ; 2 Pages.

(Continued)

*Primary Examiner* — Dah-Wei D. Yuan
*Assistant Examiner* — Stephen A Kitt
(74) *Attorney, Agent, or Firm* — Oblon, McClelland, Maier & Neustadt, L.L.P.

(57) ABSTRACT

The system includes a robot multi jet system having a spray section, a drier section, and a catalyst section. The drier section includes a warm air blower, the catalyst section includes a photocatalyst tank, and the spray section includes a plurality of jet extensions. A first jet extension connected to the photocatalyst tank sprays a uniform layer of a photocatalyst through a first set of jets, and a second jet extension that is mechanically connected to the drier section and in fluid communication with the warm air blower is configured to spray a gas onto an inner surface of the glass tube with a second set of jets. Both the drier section and the catalyst section are mounted on wheels to move the system on the inner surface of the glass tube. A motor is electrically connected to a battery mounted within the robot and mounted to the wheels.

13 Claims, 1 Drawing Sheet

(51) Int. Cl.
  *B05B 13/00* (2006.01)
  *B05C 7/08* (2006.01)
  *B05B 13/06* (2006.01)
  *C03C 17/00* (2006.01)
  *B01J 37/02* (2006.01)

(52) U.S. Cl.
  CPC ........... *B01J 37/0236* (2013.01); *B05B 5/085* (2013.01); *B05B 13/005* (2013.01); *B05B 13/0627* (2013.01); *B05C 7/08* (2013.01)

(56) References Cited

U.S. PATENT DOCUMENTS

2012/0085836 A1* 4/2012 Tiu .................... A01M 9/003
  417/234
2019/0093373 A1* 3/2019 Telleria .................. B05B 12/18

FOREIGN PATENT DOCUMENTS

| | | |
|---|---|---|
| CN | 107816211 A | 3/2018 |
| CN | 209158024 U | 7/2019 |
| CN | 215784391 U | 2/2022 |
| EP | 3 689 474 A1 | 8/2020 |
| KR | 10-2137841 | 7/2020 |

OTHER PUBLICATIONS

Jang, et al. ; Robotic dipping system for layer-by-layer assembly of multifunctional thin films ; Review of Scientific Instruments, 76 ; Oct. 5, 2005 ; Abstract Only ; 2 Pages.
Parex USA, Inc, AquaSol, May 2013 (Year: 2013).

* cited by examiner

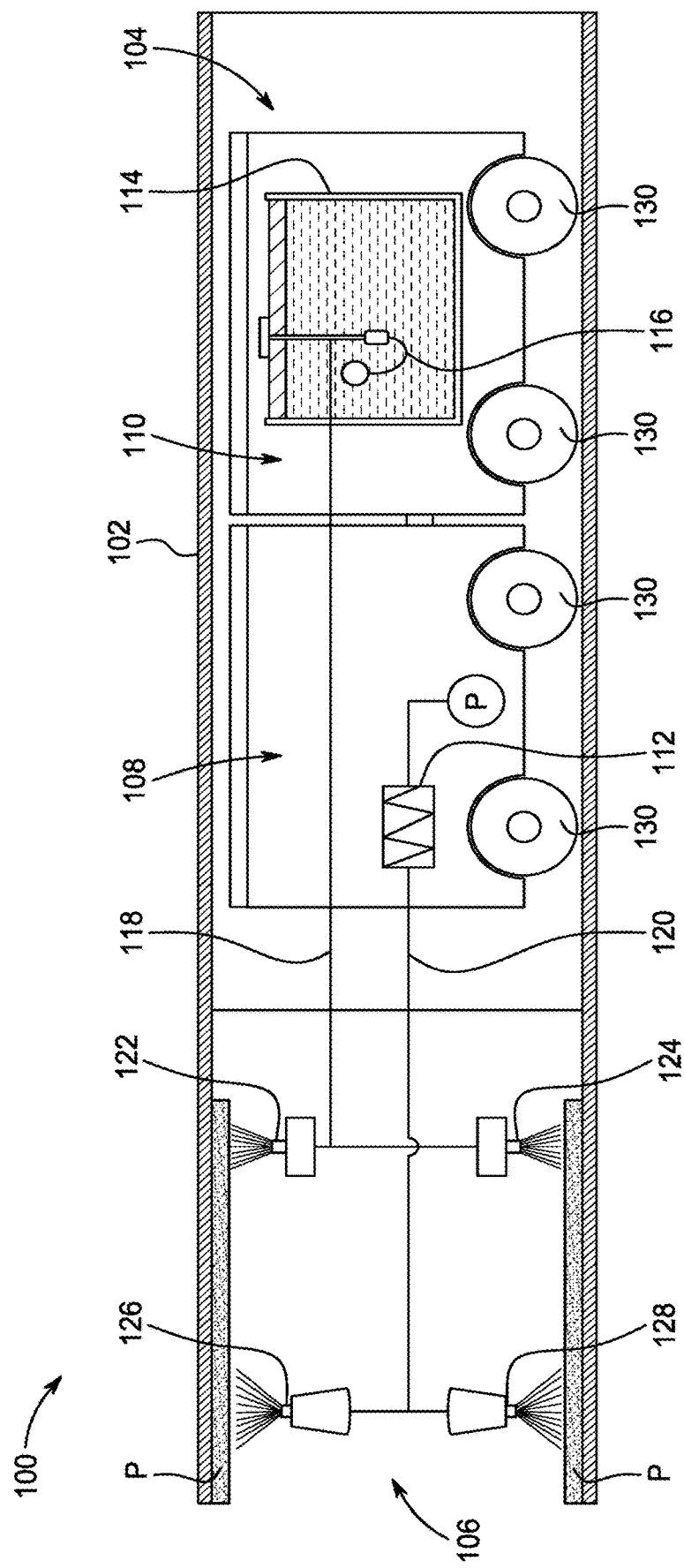

METHOD FOR COATING AN INTERIOR SURFACE OF A PIPE

CROSS-REFERENCE TO RELATED APPLICATIONS

The present application is a Continuation of U.S. application Ser. No. 17/852,442, now allowed, having a filing date of Jun. 29, 2022.

BACKGROUND

Technical Field

The present disclosure relates to a spray system and more particularly relates to a robotic multi jet spray system and method for coating the interior surface of a pipe with a substance such as a photocatalyst.

Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thin film coating is a process of depositing a coating material in the form of a thin film onto a substrate material. The coatings can be made of different materials, such as metals and oxides of metals. Thin film coatings are known to alter or improve the characteristics of the substrate material. For example, the coatings may be transparent, durable and scratch-resistant, and may increase or decrease electrical conductivity or transmission of signals. Thin film coatings may be made using various processes, such as, physical vapor deposition, magnetron sputtering, ion beam sputtering, and pulsed laser deposition.

Conventionally, a dip coat method is used to coat thin film on an exterior surface of small tubes. However, uniform coating of thin film photocatalysts on an inner surface of lengthy circular glass tubes/pipes remains a challenge.

Therefore, it is one object of the present disclosure to provide a high-performing spray system to uniformly coat an inner surface of a tube.

SUMMARY

According to one aspect of the present disclosure, a robotic multi jet system is provided. The robotic multi jet system includes a robot having a spray section, a drier section, and a catalyst section. The drier section includes a blower, preferably a warm gas (e.g., air) blower, the catalyst section includes a photocatalyst tank, and the spray section includes a plurality of jet extensions. Each jet extension terminates in one or more jets. The photocatalyst tank contains a submersible pump. A first jet extension is fluidly connected to the photocatalyst tank through the submersible pump and is configured to spray a uniform layer of a photocatalyst contained in the photocatalyst tank through a first set of jets. A second jet extension is mechanically connected to the drier section and in fluid communication with the warm air blower. The second jet extension is configured to spray a gas onto an inner surface of a tube, preferably a glass cylinder, through a second set of jets. Both the drier section and the catalyst section are mounted on wheels configured to support and move the robotic multi-jet system on the inner surface of the tube. A motor that is electrically connected to a battery mounted within the robot. The motor is preferably pivotally mounted to the wheels and configured to move the robotic multi jet system on the wheels across the inner surface of the tube.

In some embodiments, the plurality of jet extensions comprises at least 4 jets. In some embodiments, the first set of jets includes at least 2 jets, and the second set of jets includes at least 2 jets. In some embodiments, each jet of the plurality of jets is in a shape of a disc. In some embodiments, individual jets of each of the first set of jets and the second set of jets are connected in parallel with neighboring jets.

In some embodiments, the submersible pump is completely disposed within the photocatalyst tank to supply the photocatalyst to the first set of jets. In some embodiments, the individual jets of the first set of jets and the second set of jets are configured to oscillate 180° during each of spraying and drying.

In some embodiments, the tube is a cylindrical glass tube.

In some embodiments, the uniform layer has a thickness in a range of about 10 nm to about 5 μm.

In some embodiments, the blower is electrically connected to the battery and comprises a plurality of resistive healing elements electrically connected to the battery such that the blower blows warm air.

In some embodiments, the warm air blower is disposed perpendicular to the battery within the drier section.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawing, in which:

FIG. 1 illustrates an exemplary robotic multi jet system, according to an embodiment of the present disclosure.

DETAILED DESCRIPTION

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawing. References to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

FIG. 1 illustrates an exemplary robotic multi jet system 100 (hereinafter referred to as "the system 100"), according to an embodiment of the present disclosure. In an aspect, the system 100 is used to coat a material, preferably a catalyst or photocatalyst, onto an inner surface of a glass tube 102 that is circular in cross section. In some embodiments, the system can coat glass tubes 102 with a diameter ranging from 5 mm to 100 mm, preferably 10 mm to 95 mm, preferably 15 mm to 90 mm, preferably 20 mm to 85 mm, preferably 25 mm to 80 mm, preferably 30 mm to 75 mm, preferably 35 mm to 70 mm, preferably 40 mm to 65 mm, preferably 45 mm to 60 mm, preferably 50 mm to 55 mm, or 52.5 mm. In some embodiments, the system can coat glass tubes 102 with a thickness ranging from 0.5 mm to 10 mm, preferably 1 mm to 9.5 mm, preferably 1.5 mm to 9 mm, preferably 2 mm to 8.5 mm, preferably 2.5 mm to 8 mm, preferably 3 mm to 7.5 mm, preferably 3.5 mm to 7 mm, preferably 4 mm to 6.5 mm, preferably 4.5 mm to 6 mm, preferably 5 mm to 5.5 mm, or 5.25 mm. in alternate embodiments, the tube may be made of plastic, metal, ceramic, or a combination of the like. The system 100 includes a robot 104 having a spray section 106, a drier section 108, and a catalyst section 110. In some embodiments, the drier section 108 and catalyst section 110 are rigidly connected by a link. In some embodiments, the link is made of metal, plastic, polymers, or the like. In some embodiments, the link is a coupler with a length between 1 mm and 10 mm, preferably 2 mm and 9 mm, preferably 3 mm and 8 mm, preferably 4 mm and 4 mm, or 5 mm. The link is preferably in the form of a bend chain. The drier section 108 includes a warm air blower 112. In some embodiments, the warm air blower 112 is electrically connected to a battery (not shown). In some embodiments, the warm air blower 112 is disposed perpendicular to the battery within the drier section 108. In some embodiments, the warm air blower is capable of heating ambient atmosphere to a temperature ranging from 50° C. to 500° C., preferably 75° C. to 475° C., preferably 100° C. to 450° C., preferably 75° C. to 425° C., preferably 100° C. to 400° C., preferably 125° C. to 375° C., preferably 150° C. to 350° C., preferably 175° C. to 325° C., preferably 200° C. to 300° C., preferably 225° C. to 275° C., or 250° C. In some embodiments, the warm air blower 112 has a length of from 5 mm to 50 mm, preferably 7.5 mm to 47.5 mm, preferably 10 mm to 45 mm, preferably 12.5 mm to 42.5 mm, preferably 15 mm to 40 mm, preferably 17.5 mm to 37.5 mm, preferably 20 mm to 35 mm, preferably 22.5 mm to 32.5 mm, preferably 25 mm to 30 mm, or 27.5 mm. In some embodiments, the warm air blower 112 has a width of from 5 mm to 25 mm, preferably 7.5 mm to 22.5 mm, preferably 10 mm to 20 mm, preferably 12.5 mm to 17.5 mm, or 15 mm. In some embodiments, the warm air blower 112 comprises a plurality of resistive heating elements electrically connected to the battery such that the blower blows warm air. In some embodiments, the resistive heating elements are heating coils, heating wires, or heating ribbons. In a preferred embodiment, the resistive heating elements are heating wires and have a diameter ranging from 1 mm to 5 mm, preferably 2 mm to 4 mm, or 3 mm. Further, the catalyst section 110 includes a photocatalyst tank 114 having a submersible pump 116. In some embodiments, the photocatalyst tank 114 has a length of from 20 mm to 200 mm, preferably 25 mm to 175 mm, preferably 50 mm to 150 mm, preferably 75 mm to 125 mm, or 100 mm. In some embodiments, the photocatalyst tank 114 has a width of from 15 mm to 75 mm, preferably 20 mm to 70 mm, preferably 25 mm to 65 mm, preferably 30 mm to 60 mm, preferably 35 mm to 55 mm, preferably 40 mm to 50, or 45 mm. In some embodiments, the photocatalyst tank 114 contains a volume of photocatalyst ranging from 15 mL to 100 mL, preferably 20 mL to 90 mL, preferably 30 mL to 80 mL, preferably 40 mL to 70 mL, preferably 50 mL to 60 mL, or 55 mL. In some embodiments, the photocatalyst tank 114 comprises a level sensor to detect a level of the photocatalyst within the photocatalyst tank. In some embodiments, the photocatalyst tank 114 contains a photocatalyst, "P", in the form of a solution or dispersion containing one or more of ZnO, ZnS, CdS, $SrO_2$, $WO_3$, $TiO_2$, Fe—$TiO_2$, $Fe_2O_3$, $HCa_2Nb_3O_{10}$, $AgGaS_2$, $La_2Ti_2O_7$, $La_4Ti_4O_{15}$, $NaTaO_3$, $TiSi_2$, $CuAlO_2$, $CeO_2$, $In_2O_3$, $MoS_2$, $Bi_2S_3$, CuS, $BaTiO_3$, $SrTiO_3$, $Bi_2WO_6$, $ZnWO_4$, $BiVO_4$, graphene, $Bi_2O_2CO_3$, $Bi_2O_4$, other metal oxides, metal sulfides, titanates, tungstates, metalates, or graphene heterojunctions, or precursors thereof. In some embodiments, the photocatalyst within the tank 114 is a photocatalyst solution, with a solvent and a binder, where the solvent is water, methanol, ethanol, isopropyl alcohol, acetic acid, dichloromethane, tetrahydrofuran, ethyl acetate, acetonitrile, dimethyl formamide, dimethyl sulfoxide, acetone, hexamethylphosphoric triamide, pentane, hexane, benzene, carbon tetrachloride, diethyl ether, xylene, toluene, acetic acid, chloroform, and ethyl acetate. In some embodiments, the binder is cellulose, polyurethane, PAA, or other binding polymers or starches. In some embodiments, the photocatalyst within the tank 114 is a precursor solution including the photocatalyst P, in which the solution is chemically altered when it makes contact with the hot surface of the glass tribe, forming the thin photocatalyst layer itself. In other embodiments, the precursor is dissolved or dispersed in a solvent or dispersion medium which is evaporates during after spraying or is evaporated during blowing, leaving the chemically unchanged photocatalyst. In another embodiment, the photocatalyst precursor is chemical vapor deposited with a gaseous solvent to form the photocatalyst its active form on the inner surface of the tube. In some embodiments, the submersible pump 116 is fully submerged in the liquid contained within the photocatalyst tank 114. In some embodiments, the submersible pump can pump a range of 1 mL/min to 10 mL/min of the photocatalyst within the photocatalyst tank 114, preferably 2 mL/min to 9 mL/min, preferably 3 mL/min to 8 mL/min, preferably 4 mL/min to 7 or 5 mL/min. The spray section 106 includes a plurality of jet extensions, such as a first jet extension 118 and a second jet extension 120. In some embodiments, the first jet extension 118 and the second jet extension 120 have a diameter of from 1 mm to 10 mm to transport their respective fluids to their respective destinations, preferably 2 mm to 9 mm, preferably 3 mm to 8 mm, preferably 4 mm to 7 mm, or 5 mm. In some embodiments, the jet extensions 118 and 120 are fabricated of a stainless steel, aluminum, copper, bronze, brass, galvanized steel, plastics (PP, PTFE, or the like), nickel, or a combination of the like. Each jet extension terminates in a plurality of jets. In some embodiments, the first jet extension 118 has a length ranging from 0.5 to 0.8 times the entire length of the glass tube 102, preferably 0.55 to 0.75 times the length, preferably 0.6 to 0.7 times the length, or 0.65 times the length of the glass tube 102. In some embodiments, the second jet extension 120 has a length ranging from 0.1 to 0.3 times the entire length of the glass tube 102, preferably 0.15 to 0.25 times the length, or 0.2 times the length of the glass tube 102. In certain embodiments, the first jet extension 118 extends through both the catalyst section 110 and directly through the warm air blower 112 within the drier section 108. In some embodiments, the first jet extension 118 is directly parallel to the second jet extension 120, and is separated in length from a range of 10 mm to 40 mm, preferably 15 mm to 35 mm, preferably 20 mm to 30 mm, or 25 mm. In some embodiments, the plurality of jet extensions 118, 120 includes at least 4 jets. In some embodiments, the plurality of jet extensions 118, 120 includes between 4 and 20 jets, preferably 6 to 18 jets, preferably 8 to 16 jets, preferably 10 to 14 jets, or 12 jets.

The first jet extension 118 if fluidly connected to the photocatalyst tank 114 through the submersible pump 116 and is configured to spray a uniform layer of a photocatalyst contained in the photocatalyst tank 114 through a first set of jets which includes at least two jets, such as a first jet 122 and a second jet 124. In some embodiments, the submersible pump 116 is disposed within the photocatalyst tank 114 to supply the photocatalyst to the first set of jets 122, 124. In some embodiments, individual jets of the first set of jets 122, 124 are connected in parallel with neighboring jets. For example, as seen in FIG. 1, the first jet 122 and the second jet 124 are connected in parallel and are disposed at an angle of 180° with respect to each other. As such, the photocatalyst flowing through the first jet extension 118 is supplied to each of the first jet 122 and the second jet 124 simultaneously. In some embodiments, the first set of jets 122 and 124 can spray the photocatalyst at a rate ranging from 1 mL/min to 10 mL/min of the photocatalyst within the photocatalyst tank 114, preferably 2 mL/min to 9 mL/min, preferably 3 mL/min to 8 mL/min, preferably 4 mL/min to 7 mL/min, or 5 mL/min. In alternate embodiments, the first jet 122 and the second jet 124 are arranged 0° with respect to each other, meaning they are on the same side of the glass tube 102 and are separated by a lateral distance. In some embodiments, the uniform layer of the photocatalyst layer formed on the glass tube 102 has a thickness in a range of about 10 nm to about 5 μm on the glass tube 102, preferably 250 nm to 4 μm, preferably 500 nm to 3 μm preferably 750 nm to 2 μm or 1 μm. As such, the system 100 achieves a thin firm photocatalyst coating, and a structure and properties of the thin film photocatalyst coating depends on a deposition method. In alternate embodiments, the drier section 108 includes a camera (not shown) which is arranged laterally next to jets 122 and 124 to observe, through video and photo, the spraying of the photocatalyst thin film layer P on the glass tube 102. The camera is connected to an image evaluation unit, which evaluates the image of the jets 122 and 124 captured by the camera to detect errors, in certain embodiments, the camera can capture between 5 and 60 photos per minute, preferably 10 to 55 photos per minute, preferably 15 to 50 photos per minute, preferably 20 to 45 photos per minute, preferably 25 to 40 photos per minute, or 30 photos per minute.

The second jet extension 120 is mechanically connected to the drier section 108. As such, the second jet extension 120 is in fluid communication with the warm air blower 112 and is configured to spray a gas onto the inner surface of the glass tube 102 via a second set of jets which includes at least two jets, such as a third jet 126 and a fourth jet 128. In some embodiments, individual jets of the second set of jets 126, 128 are connected in parallel with neighboring jets. For example, as seen in FIG. 1, the third jet 126 and the fourth jet 128 are connected in parallel and are disposed at an angle of 180° with respect to each other. As such, the gas flowing through the second jet extension 120 is supplied to each of the third jet 126 and the fourth jet 128 simultaneously. In some embodiments, the second set of jets 126 and 128 can blow warm air at a rate ranging from 1 mL/min to 10 mL/min from the warm air blower 112, preferably 2 mL/min to 9 mL/min, preferably 3 mL/min to 8 mL/min, preferably 4 mL/min to 7 mL/min, or 5 mL/min. In alternate embodiments, the third jet 126 and the fourth jet 128 are arranged 0° with respect to each other, meaning they are on the same side of the glass tube 102 and are separated by a lateral distance. In some embodiments, the supply of the gas through the second jet extension 120 may be initiated after a predefined time interval from a start of supply of the photocatalyst through the first jet extension 118., such as between 15 seconds and 600 seconds, preferably 50 s to 550 s, preferably 100 s to 500 s, preferably 150 s to 450 s, preferably 200 s to 400 s, preferably 250 s to 350 s, or 300 s. Such a predefined time interval difference between the spraying of the photocatalyst and the gas onto the inner surface of the glass tube 102 ensures that the gas is sprayed after the spraying of the photocatalyst. Thus, the photocatalyst may be subjected to drying. In some embodiments, the photocatalyst is sprayed on the inner surface of the tube, but the blower 112 does not dry the photocatalyst when the photocatalyst is sensitive to high heat and/or risk of degradation upon heating. In other embodiments, the blower 112 does not dry the photocatalyst when the photocatalyst needs to be purged with an inert gas to limit its reactivity rather than warm air, and thus would not need the robot to spray or dry the photocatalyst. In some embodiments, the jet extensions 118 and 120 have a valve arrangement that can direct photocatalyst or warm air in the normal flow direction or against the normal flow direction in order to flush out residues from building up throughout the length of each respective jet extension. In some embodiments, the valve arrangement consists of ball or two-way valves that are sized between 1 and 5 mm, preferably 2 mm to 4 mm, or 3 mm.

In some embodiments, the individual jets of the first set of jets 122, 124 and the second set of jets 126, 128 are configured to oscillate 180° during each of spraying and drying. In some embodiments, each of the jets 122-128 oscillates between 15° to 180° during spraying and drying, preferably 30° to 165°, preferably 45° to 150°, preferably 60° to 135°, preferably 75° to 120°, or 90°. Such oscillation ensures that the photocatalyst is sprayed uniformly all along a circumference of the inner surface of the glass tube 102 preferably without any gaps and the sprayed catalyst is uniformly dried all along the circumference. In alternate embodiments, each of the jets 122-128 can rotate a full 360° around an axis of the jet extensions 118 and 120, so that each jet can respectively spray or dry both sides of the glass tube 102 at varying times at varying oscillations. In some embodiments, each jet of the plurality of jets is in a shape of a disc. As seen in FIG. 1, each jet 122-128 has a flat, thin, and circular shape, like a disc. In some embodiments, the disc shape of each of the jets 122-128 have a length ranging from 5 mm to 30 mm, preferably 7.5 mm to 27.5 mm, preferably 10 mm to 25 mm, preferably 12.5 mm to 22.5 mm, preferably 15 mm to 20 mm, or 17.5 mm. In some embodiments, the jets 122-128 take on a shape of circular nozzles, cone nozzles, bell nozzles, spine nozzles, contoured nozzles, or annular nozzles. In some embodiments, two capacitor plates are arranged in the walls of a jets 122-128 to measure the photocatalyst or warm air flow through a nozzle channel and can thus detect faults. In some embodiments, the jets 122-128 have a very small nozzle diameter, so there is a risk of clogging of the nozzles, so a filter may be added to reduce this risk of clogging of the nozzles, as the filter filters out contaminants which can lead to clogging of the nozzles.

Further, both the drier section 108 and the catalyst section 110 are mounted on wheels 130 configured to support and move the system 100 on the inner surface of the glass tube 102. In some embodiments, the wheels 130 move the system 100 along the length of the glass tube 102 at speeds ranging from 1 mm/min to 20 mm/min, preferably 2 mm/min to 18 mm/min, preferably 4 mm/min to 16 mm/min, preferably 6 mm/min to 14 mm/min, preferably 8 mm/min to 12 mm/min, or 10 mm/min. In some embodiments, the interior of wheels 130 are fabricated of steel, copper, bronze, metal alloys, plastics, ceramics, or the like. In some embodiments, the wheels 130 are substantially spherical and have a radius ranging from 1 mm to 9 mm, preferably 2 mm to 8 mm, preferably 3 mm to 7 mm, preferably 4 mm to 6 mm, or 5 mm. In alternate embodiments, the sections 108 and 110 are not mounted on wheels but are manually manipulated by the user. In alternate embodiments, the sections 108 and 110 are not mounted on wheels but are rather clamped with clamps or an adhesive to the tube 102 so that the robot can spray and dry while stationary at one point of the tube 102. In some embodiments, a motor (not shown) is electrically connected to the battery mounted within the robot and the motor is pivotally connected to the wheels and configured to move the robotic multi jet system on the wheels across the inner surface of the tube. In some embodiments, the battery provides a range of voltage ranging between 25 V and 125 V, preferably 30 V and 120 V, preferably 40 V and 110 V, preferably 50 V and 100 V, preferably 60 V and 90 V, or 75 V. The robot 104 faces the interior of the glass tube 102, having approximately a flat square shape, and includes four wheels 130, two for the drier section 208 and two for the catalyst section 100, being held by a holding arm (not shown). In some embodiments, four corners of the robot 104 each provided with a protruding portion where a motor and a wheel 130 are mounted. The motor is pivotally mounted on the robot body 104 so as to be able to change the direction of the wheel 130. The wheel 130 is driven by the motor. The wheels 130 have an outer surface made of a soft material like a rubber tire and the like for protection of the wheel.

In an aspect, based on a dimension of the glass tube 102, a battery driven robot (such as the system 100) may be designed and fabricated. When a diameter of the glass tube 102 is high, more photocatalyst may be required for spraying and achieving the uniform thickness of the photocatalyst. Additionally, based on an application that the glass tube 102 is being subjected to, thickness of the photocatalyst to be sprayed onto the inner surface thereof may vary. As such, the system 100 may be designed based on the dimension of the glass tube 102 and the application. In some embodiments, the system 100 may include a supply regulator (not shown) configured to regulate supply of the photocatalyst through the first jet extension 118 based on the application. For example, the glass tube 102 sprayed with the photocatalyst may be used in, but not limited to, wastewater treatment plants, desalination systems, energy and electroplating systems, and production of renewable energy ($H_2$). In some embodiments, depending on the thickness of the photocatalyst required, a user may provide an input to the supply regulator to constantly supply a predefined volume of the photocatalyst through the first jet extension 118.

To this end, it is understood that the present disclosure provides an easy process to uniformly coat the thin film photocatalyst onto the inner surface of glass tubes.

As used herein, the terms "a" and "an" and the like carry the meaning of "one or more."

Obviously, numerous modifications and variations of the present invention are possible in light of the above teachings. It is, therefore, to be understood that, within the scope of the appended claims, the invention may be practiced otherwise than as specifically described herein.

The invention claimed is:

1. A method of coating an interior surface of a pipe, comprising:
spraying, with a robotic multi jet system present inside the pipe, a composition comprising a photocatalyst onto the interior surface of the pipe to form a sprayed interior surface, then
drying, with the robotic multi-jet system present inside the pipe, the sprayed interior surface to form a coated interior surface;
wherein the robotic multi jet system comprises:
a robot having a spray section, a drier section, and a catalyst section;
wherein the drier section comprises a warm air blower;
the catalyst section comprises a photocatalyst tank, and
the spray section comprises a plurality of jet extensions, wherein each jet extension terminates in one or more jets;
wherein the photocatalyst tank contains a submersible pump; and
wherein a first jet extension is fluidly connected to the photocatalyst tank through the submersible pump and is configured to spray a uniform layer of a photocatalyst contained in the photocatalyst tank through a first set of jets, and a second jet extension is mechanically connected to the drier section in fluid communication with the blower and is configured to blow a gas onto the interior surface of the pipe through a second set of jets;
wherein the first and second jet extensions are made of stainless steel;
wherein the drier section and the catalyst section are separate sections that are connected by a metal bend chain link;
wherein both the drier section and the catalyst section are separately mounted on wheels configured to support and move the robotic multi jet system on the interior surface of the pipe;
wherein the spray section, the drier section, and the catalyst section are laterally connected with the drier section at a first end, the spray section at a second end and the catalyst section in between the first and second ends;
wherein the first set of jets are located at a terminal end of the second end;
wherein the second set of jets are located in between the first set of jets and the catalyst section; and
a motor that is electrically connected to a battery mounted within the robot, wherein the motor is pivotally mounted to the wheels and configured to move the robotic multi jet system on the wheels across the interior surface of the pipe.

2. The method of claim 1, wherein each jet extension of the plurality of jet extensions of the robotic multi jet system comprises at least 4 jets.

3. The method of claim 1, wherein the first set of jets of the robotic multi jet system comprises at least 2 jets.

4. The method of claim 1, wherein the second set of jets of the robotic multi jet system comprises at least 2 jets.

5. The method of claim 1, wherein the submersible pump of the robotic multi jet system is completely disposed within the photocatalyst tank to supply the photocatalyst to the first set of jets.

6. The method of claim 1, wherein each jet of the plurality of jets of the robotic multi jet system is in a shape of a disc.

7. The method of claim 1, wherein individual jets of the first set of jets of the robotic multi jet system are connected in parallel with neighboring jets.

8. The method of claim 1, wherein individual jets of the second set of jets of the robotic multi jet system are connected in parallel with neighboring jets.

9. The method of claim 1, wherein the individual jets of the first and second set of the robotic multi-jet system are configured to oscillate 180° during spraying.

10. The method of claim 1, wherein the pipe is a cylindrical glass tube.

11. The method of claim 1, wherein the uniform layer has a thickness of from 10 nm to 5 μm.

12. The method of claim 1, wherein the blower is electrically connected to the battery and comprises a plurality of resistive heating elements electrically connected to the battery such that the blower blows warm air.

13. The method of claim 12, wherein the blower is disposed perpendicular to the battery within the drier section.

\* \* \* \* \*